United States Patent
Petrone

(10) Patent No.: US 6,852,227 B1
(45) Date of Patent: Feb. 8, 2005

(54) FLOW-THROUGH MEDIA

(75) Inventor: Richard J. Petrone, Erie, PA (US)

(73) Assignee: JRJ Holdings, LLC, Washington, IL (US)

( * ) Notice: Subject to any disclaimer, the term of this patent is extended or adjusted under 35 U.S.C. 154(b) by 0 days.

(21) Appl. No.: 10/837,372

(22) Filed: Apr. 29, 2004

(51) Int. Cl.$^7$ .................................................. C02F 3/08
(52) U.S. Cl. ........................ 210/616; 210/619; 210/150; 261/DIG. 72; 435/299.1
(58) Field of Search ................................. 210/615, 616, 210/619, 150, 151; 261/DIG. 72; 435/299.1

(56) References Cited

U.S. PATENT DOCUMENTS

| | | | |
|---|---|---|---|
| 2,212,932 A | | 8/1940 | Fairlie |
| 2,709,128 A | * | 5/1955 | Krause ................ 261/DIG. 72 |
| 3,365,180 A | * | 1/1968 | Lerner ................. 261/DIG. 72 |
| 3,540,589 A | | 11/1970 | Boris |
| 3,758,087 A | | 9/1973 | Hoon, Jr. |
| D232,174 S | | 7/1974 | La Borde |
| D232,236 S | | 7/1974 | La Borde |
| D232,237 S | | 7/1974 | La Borde |
| D232,238 S | | 7/1974 | La Borde |
| 3,882,027 A | | 5/1975 | Lunt |
| 3,913,890 A | | 10/1975 | Lankenau et al. |
| 3,914,351 A | | 10/1975 | McKeown et al. |
| 3,956,127 A | * | 5/1976 | Holmberg ................... 210/150 |
| 3,957,931 A | | 5/1976 | Ellis et al. |
| 4,028,244 A | | 6/1977 | Holmberg |
| 4,086,307 A | | 4/1978 | Glaspie |
| 4,115,269 A | | 9/1978 | Bennett et al. |
| 4,122,011 A | | 10/1978 | Strigle, Jr. |
| 4,200,532 A | | 4/1980 | Iwatani et al. |
| 4,333,893 A | | 6/1982 | Clyde |
| 4,425,285 A | | 1/1984 | Shimoi et al. |
| 4,537,731 A | | 8/1985 | Billet et al. |
| 4,554,114 A | | 11/1985 | Glen et al. |
| 4,668,387 A | | 5/1987 | Davie et al. |
| 4,668,442 A | | 5/1987 | Lang |
| 4,842,920 A | | 6/1989 | Banai et al. |
| 5,240,597 A | | 8/1993 | Ueda |
| 5,290,435 A | * | 3/1994 | Stilkenboom ................ 210/151 |
| 5,350,507 A | | 9/1994 | McManus |
| 5,395,529 A | | 3/1995 | Butler |
| 5,401,398 A | | 3/1995 | McManus |
| 5,543,039 A | * | 8/1996 | Odegaard ................... 210/150 |
| 5,766,454 A | | 6/1998 | Cox et al. |
| 5,788,836 A | | 8/1998 | Davis |
| 6,554,996 B1 | | 4/2003 | Rebori |
| 6,585,886 B1 | | 7/2003 | Luehr |

FOREIGN PATENT DOCUMENTS

GB  1275116  5/1972

OTHER PUBLICATIONS

*Rachig Rings*—http://www.novalek.com/aqvtc22.htm, Novalek, Inc., 2000.
Perry's Chemical Engineer's Handbook (6th ed.) p. 18–20, Fig. 18–34, 1973.

* cited by examiner

*Primary Examiner*—Christopher Upton
(74) *Attorney, Agent, or Firm*—Brinks Hofer Gilson & Lione

(57) ABSTRACT

A flow-through medium for use in a biological digester has a truncated conical shape, a plurality of internal ribs, and optional external ribs. The conical shape of the media creates a venturi-like action for fluid flowing through the media, which increases the tumbling of the media elements against each other and against the wall of the enclosure in which they are contained. Moreover, the conical shape and venturi-like action prevents slough from accumulating within the media elements, allowing it to be washed through the media.

A method of treating sewage effluent includes placing the media elements in an enclosure partially submersed in the effluent and rotating the enclosure to expose the media to the effluent and to a source of oxygen.

20 Claims, 2 Drawing Sheets

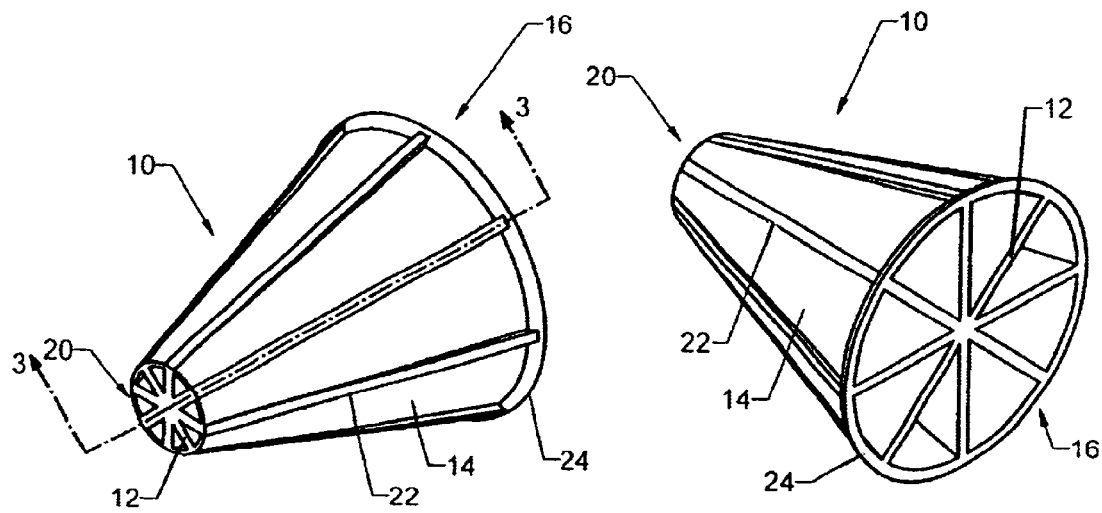
FIG. 1
FIG. 2
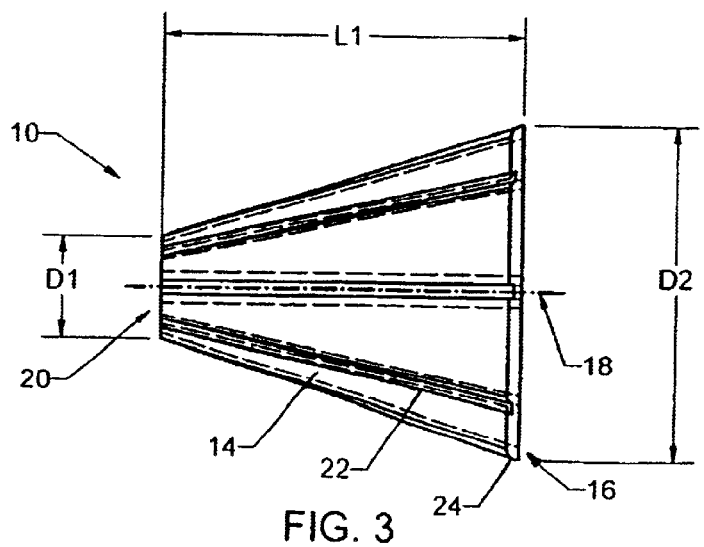
FIG. 3

FLOW-THROUGH MEDIA

BACKGROUND

1. Technical Field

The present invention relates to a method and apparatus for use in the purification of polluted liquids and other effluents. In particular, the present invention relates to bacterial support media and a method for use of such media in the biological treatment of wastewater.

2. Background Information

Wastewater treatment systems must be capable of converting a stream of wastewater into a condition suitable for discharge into the surrounding ecosystem. Some types of systems contain rotating biological contactors (RBCs), which are used to host aerobic bacteria. The RBCs work to provide those bacteria with a continual supply of all life-supporting ingredients, including food, oxygen and protective housing.

Original RBCs consisted of plastic sheets attached to a central shaft. Bacteria would attach themselves onto the plastic sheets, and the bacteria would be exposed to both food and water by rotating the shaft and sheets into a bath of wastewater. As the bacteria are rotated into the bath, they are exposed to their source of food—the organic matter in the wastewater. As the rotation cycle continues out of the bath, the bacteria receive oxygen. One limitation with this design is that the bacteria are allowed to grow and die in a normal life cycle without a cleansing function. The result is a buildup of dead bacteria carcasses (slough) around the shaft, creating a "dead zone" in the system and a weakening of the shaft.

Subsequent RBC designs attempted to eliminate the buildup of slough by replacing the central shaft and plastic sheets that were used in prior designs with a randomly organized group of plastic media in a rotating cage or basket. One example of such an assembly is described in U.S. Pat. No. 5,401,398, to McManus, which is incorporated herein by reference. The various arrangements of the plastic media provide the surface area onto which the bacteria can attach. The rotation of the basket forces the media into and out of the bath of wastewater, exposing them to the requisite food and oxygen.

One type of media used in these subsequent RBCs, for example the media disclosed in U.S. Pat. No. 5,401,398, to McManus, has a cup-like or hemispherical shape to assist in bailing the wastewater. These shapes, by their basic design, incorporate a "dead zone" at the bottom of the cups where the slough builds up, substantially reducing overall performance of the wastewater treatment system.

Another type of media is a Rashig ring type media, which is described in U.S. Pat. No. 3,540,589, to Boris, in an apparatus for the purification of polluted water, for example. Rashig rings may be short tubular elements that do not contain any protrusions into the interior of the tube. Although this type of media does not have a closed end in which bacteria slough can accumulate, it has the disadvantage that there is insufficient surface area upon which bacteria can attach. Further, this type of media has no mechanism for assuring that the rings undergo sufficient tumbling action to provide maximum contact with the wastewater.

Other types of media have been disclosed by others. For example, U.S. Pat. No. 3,914,351, to McKeown et al., describes a polypropylene media element for use in a packed bed tower where the media has "the form of a truncated cone, the longitudinal axis of which preferably defines an angle of not more than 30° at the hypothetical apex thereof." The ratio of the diameter to the width (i.e., longitudinal length) is preferably more than 1.5:1. The media may have a series of full length internal ribs. Despite the extra surface area of the ribs, the short stature of the media relative to their diameter make them undesirable for use in rotating digesters, which require media more susceptible to random tumbling rather than an ordered packed arrangement of a packed bed.

Therefore, there is a need for a type of media that may be used in wastewater treatment systems and that overcomes the disadvantages of the prior art by providing sufficient contact area onto which bacteria can attach, reducing the accumulation of slough on the media, and providing sufficient tumbling action to assure maximum efficiency of the wastewater treatment system.

SUMMARY

One aspect of the present invention is a flow-through media element having an outer wall defining a truncated conical shape with two open ends and a plurality of internal ribs. The length of the medium element is greater than the largest diameter of both open ends. The internal ribs may extend through the outer wall to create external ribs or separate external ribs may be affixed to the outer wall. The flow-through media may also optionally contain a rim along the perimeter of either end of the media element or both ends. The configuration of the media element of the present invention is believed to create a venturi-like effect that promotes tumbling of the media elements, contact of fluid with the media member, and removal of unwanted debris within the media element.

Another aspect of the present invention is a method of treating effluent. The method includes placing a plurality of the media elements of the present invention in an enclosure partially submersed in the effluent and rotating the enclosure to expose the media to the effluent and to a source of oxygen. This method provides an efficient way to remove impurities from a wastewater stream.

Additional features and advantages of the present invention will be apparent to one of ordinary skill in the art from the drawings and detailed description of the preferred embodiments below.

BRIEF DESCRIPTION OF THE DRAWINGS

FIG. 1 is a perspective view of one embodiment of a media element of the present invention.

FIG. 2 is another perspective view of the media element shown in FIG. 1.

FIG. 3 is a sectional view of the media element shown in FIG. 1, taken along line 3—3.

DETAILED DESCRIPTION OF PRESENTLY PREFERRED EMBODIMENTS

Figure 4:
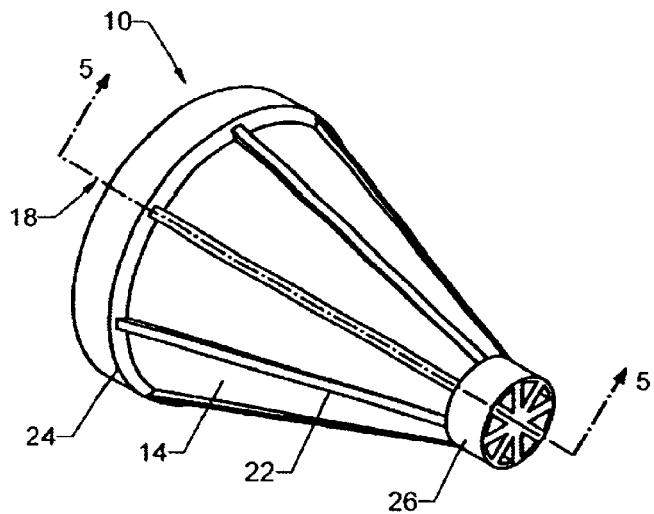
FIG. 4 is a perspective view of another embodiment of a media element of the present invention, which includes a rim on each end of the media element.

Now with more particular reference to the drawings, FIGS. 1, 2 and 3 show one embodiment of the flow-through media element 10 of the present invention. FIG. 2 shows another perspective view of the embodiment of the media element in FIG. 1. FIG. 3 shows a sectional view taken along line 3—3 of the embodiment of the media element shown in FIG. 1. The outer wall 14 of the media element 10 defines a truncated conical shape having a central longitudinal axis 18. This embodiment contains eight internal ribs 12. The internal ribs 12 extend radially from the central longitudinal axis 18 and adjoin with the outer wall 14 of the media element 10, and extend longitudinally from a first end 20 to a second end 16 of the media element 10. In this embodiment, the internal ribs 12 are equidistant from each other and are of similar length and width.

This embodiment also contains a plurality of external ribs 22 on the outer wall. These external ribs 22 may be continuations of the internal ribs which extend outwardly through the outer wall 14 of the media element 10. Alternatively, the external ribs 22 may be separate ribs affixed to the outer wall, either aligned or offset from the internal ribs 12, and may be of a number greater than or less than the number of internal ribs 12. These external ribs 22 provide texture to the outer wall 14 and provide additional surface area upon which bacteria can attach. The outer wall 14 and plurality of ribs 22 preferably have a continuous non-perforated surface. A rim 24 circumscribes the diameter of the second end 16 and serves as a smooth endpoint at which the external ribs 22 are attached, such that the ends of the ribs do not protrude beyond the smooth "envelope" of the media element.

The presence of the internal ribs 12 and the external ribs 22 on the media element 10 of the invention increases the surface area onto which bacteria can attach. As a result, the fluid stream that enters the media element 10 has sufficient contact with the bacteria to remove the impurities from the stream.

The first end 20 of the media element 10 has a diameter D1 that is smaller than the diameter D2 of the second end 16. In addition, the length L1 of the media element 10, which extends from the first end 20 to the second end 16, exceeds the diameter D2 of the second end 16. Preferably, the ratio of length L1 to diameter D2 is between 1:1 and 2:1, and more preferably, between 1:1 and 1.5:1. Most preferably, the ratio of length L1 to diameter D2 is about 1.1:1.

The angle formed by the outer wall 14 of the media element 10 and the central longitudinal axis 18 of the media element 10 is between 0° and 45°, preferably between 10° and 30°, and more preferably between 15° and 25°. Most preferably, the angle is about 18.5°.

Figure 5:
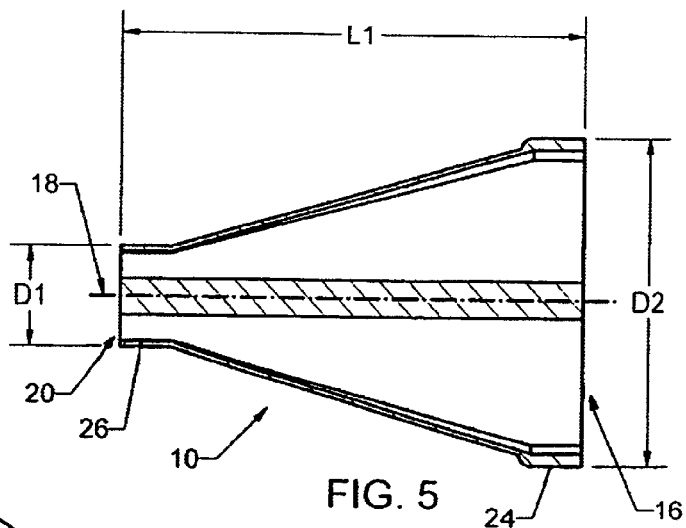
FIG. 5 is a sectional view taken along line 5—5 of FIG. 4.
Figure 6:
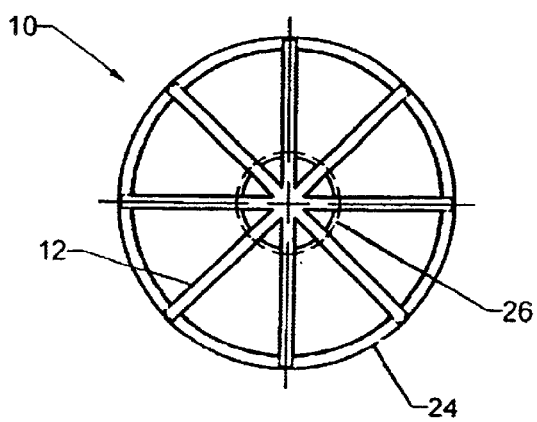
FIG. 6 is an end view of the media element shown in FIG. 4.

FIGS. 4, 5, and 6 show another embodiment of a media element of the present invention. FIG. 5 is a sectional view taken along line B—B of FIG. 4. FIG. 6 is a bottom perspective view of the embodiment of FIG. 4. These figures illustrate eight internal ribs 12 contained within a truncated conical shape having a central longitudinal axis 18 and eight external ribs 22 on the outer wall 14 aligned with the internal ribs 12. The internal ribs 12 extend radially from the central longitudinal axis 18 and adjoin with the outer wall 14 of the media element 10, and extend longitudinally from a first end 20 to a second end 16 of the media element 10. In this embodiment, the internal ribs 12 are equidistant from each other and are of equal length and width. The external ribs 22 may be continuations of the internal ribs 12 which extend outwardly through the outer wall 14 of the media element 10, or they may be separate ribs affixed to the outer wall 14. The outer wall 14 and external ribs 22 preferably have a continuous non-perforated surface.

This embodiment also contains a rim 24 that circumscribes the periphery of the larger end 16 of the media element 10 and a rim 26 that circumscribes the periphery of the smaller end 20. Alternatively, the rim may circumscribe only one end of the media element 10. The rims have an outer surface that is coaxially aligned with the central longitudinal axis 18.

Similar to the embodiment illustrated in FIGS. 1, 2 and 3, the embodiment illustrated in FIGS. 4, 5 and 6 has a first end 20 of the media element 10 having a diameter D1 that is smaller than the diameter D2 of the second end 16. In addition, the length L1 of the media element 10 exceeds the diameter D2. Preferably, the ratio of length L1 to diameter D2 is between 1:1 and 2:1, and more preferably, between 1:1 and 1.5:1. Most preferably, the ratio of length L1 to diameter D2 is about 1.1:1. The angle formed by the outer wall 14 of the media element 10 and the central longitudinal axis 18 of the media element 10 is between 0° and 45°, preferably between 10° and 30°, and more preferably between 15° and 25°. Most preferably, the angle is about 18.5°.

The media of the present invention may be made of plastic. Preferably, the media are made of polypropylene. Alternatively, the media may be made of other suitable materials, such as metal or ceramic, which provide suitable support and adhesion to the aerobic bacteria in the biological digester.

Other embodiments of the media element may contain different numbers of radial ribs. Desirably, the media element contains between four and twelve ribs. More desirably, the media element contains between six and ten ribs. Most desirably, the media element contains eight ribs. As the number of ribs within the media element increases, the surface area in contact with the wastewater also increases. Too many ribs, however, may restrict the smaller open end of the media element and impede the flow of fluid through the media element, which increases the potential for clogging. Consequently, the number of ribs should not exceed about fourteen, depending on the diameter of the smaller end.

The media element of the preferred embodiment has several advantages over the prior art. First, the open design of the media element allows fluid to pass into one end of the media element and out the other end without allowing slough to accumulate in a "dead zone," such as the bottom of a cup-like or hemispherical media element. The open conical design is believed to provide a venturi-like effect, which not only assures adequate contact of the bacteria with the entering fluid, but also assures that the slough is scoured off and washed through the media element rather than being retained within it.

Second, and without the invention being bound by any theory of operation, the conical shape and extended length of the flow-through media is believed to create venturi-like movement of fluid therethrough. The fluid movement causes a momentum transfer resulting in random tumbling action in the rotating basket of a biological digester to ensure maximum performance and efficiency of the digester. When fluid passes from the larger first end 16 of the media element 10 to the smaller second end 20, a constriction in flow results. Conversely, when fluid passes from the smaller second end 20 of the media element 10 to the larger first end 16, a drop in pressure results, thereby creating a backwash turbulence. Without being bound by any theory, it is believed that these random changes in flow produce a hydraulic flow situation which maximizes system performance by creating a tumbling action to: (1) prevent nesting of the media elements, (2) ensure adequate contact of the fluid with the media elements, and (3) flush the media elements to prevent the accumulation of slough within them.

The media elements of the present invention may be used in a wastewater treatment assembly containing a rotating biological contactor, exemplified by U.S. Pat. No. 5,350,507, to McManus. Preferably, the media elements are used in a packaged wastewater treatment unit described in the commonly-owned, co-pending application Ser. No. 10/835,805, to Richard J. Petrone, filed on the same date as the present application, which co-pending application is hereby incorporated herein by reference. A plurality of media elements may be placed inside a rotating biological digester basket or other enclosure in the wastewater treatment unit. The media elements and their ribs provide adequate surface area onto which aerobic bacteria may attach. As the rotating digester basket presents the media elements into the wastewater, water will enter some of the media elements through the smaller end and it will enter other media elements through the larger end, resulting in a random tumbling action of the media elements against each other and against the wall of the rotating basket. Preferably, after the fluid stream leaves the basin containing the digester basket, the fluid enters a clarifier where any remaining solids are removed. Then, the clarified fluid enters a disinfector where any residual bacteria is removed by exposing the stream to ultraviolet radiation or a chlorinating injector, resulting in an effluent that satisfies the requirements of the National Sanitation Foundation for surface discharge.

The media elements of the present invention may also be used in other types of systems used to treat polluted liquids or other effluents. For example, the media elements of the present invention may be used in scrubbers or packed towers that use random or dumped packings.

Another aspect of the present invention is directed to a method of treating effluent in a rotating biological digester. The method includes placing a plurality of media elements in an enclosure partially submersed in the effluent containing organic waste and rotating the enclosure to expose alternately the media to the effluent and to a source of oxygen. Desirably, the bulk volume of the media occupies between about 40% and about 95% by volume of the enclosure. More desirably, the bulk volume of the media occupies about 80% by volume of the enclosure. Rotating the enclosure with the noted loading causes the media elements to tumble randomly. Thus, the media elements are presented alternately into and out of the effluent such that the effluent flows through some of the media randomly in either one end or the other and out the opposite end.

One type of effluent that may be treated using the method of the present invention is wastewater effluent. Preferably, the wastewater is sewage from a typical household. By passing a stream of wastewater through the media element 10 of the present invention and exposing the bacteria on the media element 10 to sources of food and oxygen, the bacteria serves to remove the impurities from the wastewater.

It is intended that the foregoing detailed description be regarded as illustrative rather than limiting, and that it be understood that it is the following claims, including all equivalents, that are intended to define the spirit and scope of this invention.

What is claimed is:

1. A flow-through medium for use in a biological digester comprising:
   an outer wall defining a truncated conical shape having a central longitudinal axis, a first opening at a first end having a first diameter and a second opening at a second end having a second diameter, wherein the first diameter is less than the second diameter, and having a longitudinal distance between the first end and second end greater than the second diameter; and
   a plurality of internal ribs extending radially from the central axis and adjoined with the outer wall and extending longitudinally from the first end to the second end.

2. The medium of claim 1 wherein the plurality of internal ribs extend outwardly through the outer wall to provide a plurality of external ribs.

3. The medium of claim 1 wherein the plurality of internal ribs comprise between four and twelve ribs.

4. The medium of claim 1 wherein the plurality of internal ribs comprise between six and ten ribs.

5. The medium of claim 1 where in the plurality of internal ribs comprise eight ribs.

6. The medium of claim 1 wherein the medium comprises polypropylene.

7. The medium of claim 1 wherein the outer wall forms an angle with the central axis of between about 10 degrees and 30 degrees.

8. The medium of claim 7 further comprising a rim circumscribing the periphery of at least one of the first end or second end of the outer wall, the rim having an outer surface coaxially aligned with the central axis.

9. The medium of claim 1 wherein the outer wall and plurality of ribs have a continuous non-perforated surface.

10. The medium of claim 1 wherein the ratio of the longitudinal distance to the second diameter is such that the flow-through medium will undergo tumbling.

11. A method of treating sewage effluent in a biological digester comprising:
   placing a plurality of media, said media having an outer wall defining a truncated conical shape having a central longitudinal axis, a first opening at a first end having a first diameter and a second opening at a second end having a second diameter, wherein the first diameter is less than the second diameter, and having a longitudinal distance between the first end and second end greater than the second diameter; and a plurality of internal ribs extending radially from the central axis and adjoined with the outer wall and extending longitudinally from the first end to the second end, in an enclosure partially submersed in the effluent; and
   rotating the enclosure to expose the media to the effluent and to a source of oxygen.

12. The method of claim 11 wherein sufficient media are placed in the enclosure such that the bulk volume of the media occupies between about 40% and about 95% by volume of the enclosure.

13. The method of claim 12 wherein the rotating comprises repeatedly presenting the media into and out of the effluent such that the effluent flows through some of the media randomly in either of the first end or second end and out the opposite end.

14. The method of claim 11 wherein sufficient media are placed in the enclosure such that the bulk volume of the media occupies about 80% by volume of the enclosure.

15. The method of claim 11 wherein the plurality of internal ribs comprise between about four and twelve ribs.

16. The method of claim 11 wherein the plurality of internal ribs comprise between about six and eight ribs.

17. The method of claim 11 wherein the media further comprise a plurality of external ribs.

18. The method of claim 11 wherein the enclosure comprises a biological digester basket.

19. The method of claim 11 wherein the media comprise polypropylene.

20. A method for treating sewage effluent in a biological digester comprising:

providing a contactor media having a frustro-conical shaped external surface having a longitudinal center axis and defining openings at both ends, the angle between the external surface and the center axis being less than 45 degrees, the media further having a longitudinal length of the center axis being longer than a largest diameter of the openings, and having at least four ribs radially extending from the center axis and protruding radially beyond the external surface;

placing a sufficient amount of the contactor media in a rotating biological digester basket to fill between 40% and 95% of the basket volume; and rotating the basket in operation of the sewage treatment unit.

* * * * *